United States Patent Office 2,966,473
Patented Dec. 27, 1960

2,966,473

MOLDING COMPOSITION CONTAINING UREA FORMALDEHYDE RESIN, GYPSUM, AND GLASS FIBER

Lawrence P. Biefeld, Granville, and Richard F. Shannon, Lancaster, Ohio, assignors to Owens-Corning Fiberglas Corporation, a corporation of Delaware No Drawing. Continuation of application Ser. No. 284,202, Apr. 24, 1952. This application Feb. 28, 1956, Ser. No. 568,164

5 Claims. (Cl. 260—29.4)

This invention relates to a molding composition formed principally of calcined gypsum and more particularly to the combination in a molding composition of urea formaldehyde resin forming material and calcined gypsum reinforced with glass fibers and to methods for molding same into a new and improved product of high strength and stability.

In our application filed on April 24, 1952, and entitled "Plastic Molding Composition," Serial No. 284,201, now abandoned, description is made of a molding composition formed of calcined gypsum and melamine formaldehyde resin forming material containing certain accelerators and retarders in proportions to provide a desired balance between good pot life ranging from 1 to 7 hours and a rapid curing rate of about ½ to 2 minutes under molding conditions and to provide for substantially simultaneous cure of the resinous and cementitious components in order to minimize separation of one from the other in the molded product. Curing is continued under molding conditions in the process described until the material has taken sufficient set to permit removal from the mold form and cure is continued to a hard and strong product by subsequent hydration upon immersion in water or by exposure to conditions which forms a water film on the surfaces of the molded product.

In order to permit removal from the mold space before cure of the components has been completed, and while the molded product is somewhat flexible, it is necessary to formulate the molding composition with no more than the amount of water theoretically required to combine with the gypsum to set the cement. Less than the theoretical amount of water may be used if flow of the desired character is available but the deficiency in water must be supplied from the condensation of the organic resinous components during cure or by the subsequent hydration step.

The conditions advanced for the preparation of a molding compound of the type described from melamine formaldehyde resin forming material and calcined gypsum, reinforced with glass fibers, have not been found to be applicable to the preparation of a suitable molding compound with urea formaldehyde resin forming material and calcined gypsum also having glass fibers as reinforcement. In fact, vast differences exist in the conditions under which balance between pot life and curing rate may be secured, the extent of cure required before removed from the mold dies, and the conditions for molding as well as the effect of subsequent hydration of the molded product.

Molding compositions have been compounded of urea formaldehyde resin and calcined gypsum but, in general, such compositions have been subject to considerable objections because of their long curing rate and the non-uniformity of products molded therefrom.

It an object of this invention to produce a molding composition of urea formaldehyde resin forming material and calcined gypsum which is characterized by good shelf life or pot life but may be rapidly cured into a molded product of high strength and of substantially uniform composition throughout.

Another object is to produce a molding composition based upon urea formaldehyde resin forming material and calcined gypsum which has good flow, which embodies a desirable balance between pot life and rate of cure, in which cure of the resinous and cementitious components proceed simultaneously and produce a molded product in which no apparent migration or separation takes place between ingredients, which produces a filled and compact molded product of uniform character throughout, which is reinforced with glass fibers markedly to improve the strength properties of the molded product, and in which the fiber reinforcement shifts with the molding composition during flow to remain substantially uniformly distributed throughout the molded product and it is a related object to provide products molded therefrom and to provide a new and improved method for molding same.

In accordance with the practice of this invention, a molding composition embodying the improvements described is formed of urea formaldehyde resin forming material in a water soluble stage and calcined gypsum present in the ratio of 1 part by weight urea formaldehyde resin to 2 to 8 parts by weight gypsum, with water present in amounts sufficient to provide for flow of the desired character for filling the mold cavity under conditions of molding but preferably less water than the amount theoretically required to satisfy the gypsum for cure to the cement. An accelerator for the cement cure and a hardener to enhance resinous cure are embodied in the molding composition in desired proportions to cause curing to take place substantially simultaneously with both components and to adjust the pH conditions of the molding composition to a level satisfactory for resinous cure. In the absence of glass fibers, a composition of the type described is capable of being formed into a molded product but the product is brittle in character and fairly weak. With the addition of from 1 to 10 percent by weight glass fibers of reinforcing lengths, the tensile, flexure and impact strengths are increased many-fold without upsetting the balance with respect to pot life, curing rate or undesirably affecting flow of the molding composition.

The inventive concepts may be described in greater detail in connection with the following examples, given by way of illustration and not by way of limitation:

EXAMPLE 1

*Molding composition*

100 parts calcined gypsum
42 parts urea formaldehyde resin solution (Urac 180, 66% solids in water)
0.25 part Red Top retarder
1.0 part zinc stearate
0.5 part sodium chloride
0.5 part tartaric acid
3.0 parts water
7.5 parts glass fiber strands cut to ½ inch lengths All the constituents except the glass fibers are combined to form a plastic mass either by hand mixing or in a mechanical mixer, such as a Hobart mixer. While the order of incorporating the ingredients to form the molding composition is not critical, it is preferred to dissolve the sodium chloride and tartaric acid in the amount of free water and then introduce the solution into a mixing bowl with the solution of urea formaldehyde resin forming material followed by mixing at relatively low speeds. The retarder is mixed dry with the calcined gypsum and then the mixture is added slowly to the bowl with continuous stirring to form a slurry. When the mixture has become smooth, the glass fibers are added and mixed by hand or by spatula to secure complete wetting out in order to prevent balling by subsequent mechanical mixing.

EXAMPLE 2

*Molding*

A measured gob of molding compound is weighed or otherwise introduced into the mold cavity. If molded under pressure of about 2000 pounds per square inch between mold surfaces heated to 260° F., cure to a set stage results in from 3–6 minutes. In order to enhance removal of the molded product, it is desirable to lubricate the mold surfaces with a polysiloxane fluid or else with a metal soap applied to the surfaces or dusted onto the gob as it is being introduced.

While special operations are not required for cure of molding compositions formed of melamine formaldehyde resin and calcined gypsum, as defined in our copending application, the curing rate of the compound embodying features of this invention is increased and a more desirable molded product is formed when the mold dies are "bumped" or opened one or more times during the molding cycle to release vapors and moisture. Unless released, the presence of such moisture will retard and often reverse the resinification reaction.

Another distinguishing factor between the urea formaldehyde-gypsum cement composition as compared to the system based upon melamine formaldehyde and gypsum resides in the conditions for securing complete cure to the final stage of the molded product. With the melamine-gypsum system, cure of the molding compound may be carried out in the mold dies to an incomplete stage but to a stage wherein the material is set to mold shape. Continued cure may be achieved outside the mold dies by hydration in contact with water. This technique has been found to be impractical with systems based upon urea formaldehyde resin and gypsum. It has been necessary with compositions of the type described herein to carry the cure substantially to completion while in the mold dies in order to obviate migration or possible leaching of the materials by water as much as possible. As a result, the molding cycle of the composition based upon urea resin and gypsum is comparatively lengthened and special techniques are desired in the molding operation, such as breathing the mold to release generated vapors and the like. Consequently, post-hydration in water has little, if any, desirable effect on the molded product although some improvement in strength and hardness appears to result from post-hydration under humidity conditions less than 100 percent or less than that capable of forming a water film on the surface of the molded product.

It is important in compounding the molding composition to limit free water introduced, including the diluent for the urea formaldehyde resin, to an amount less than the 18.6 parts which is calculated theoretically to combine with calcined gypsum to form the cured cement. If more is added, the excess water markedly slows the cure of the resinous phase and, under conditions of molding, may even cause hydrolyzation to reverse the resin forming reaction and produce an inferior product. The amount of vapors present when an excess of moisture is provided in the molding composition cannot readily be eliminated by the breathing or bumping operations and such excesses in vapor have been found to cause the formation of blisters or bubbles in the molded product. It is preferred to introduce water in amounts to provide a concentration in the molding composition within the range of 16 to 18 parts per 100 parts calcined gypsum. Slightly less water can be used consistent with the ability to secure flow sufficient to fill the mold under conditions for molding.

While the type of calcined gypsum is not critical to the practice of this invention, it is most desirable to make use of a gypsum which is neutral and to rely upon the addition of acidic substances to lower the pH of the composition to the range in which the urea formaldehyde is capable of resinification to a cured state.

The ratio of calcined gypsum to urea formaldehyde resin is limited to more than one part by weight of urea resin forming material to 8 parts by weight calcined gypsum. Best results are secured with a ratio of about 1 part by weight urea resin to 4 parts by weight gypsum. More urea resin can be used but it is uneconomical to exceed a ratio of about 1 part by weight urea resin to 2 parts by weight cement. If a higher ratio of urea resin is used, the product begins to acquire the characteristics and limitation of the resinous component rather than that desired of the cementitious material. Urea resin in a water soluble stage is preferred. It may be added as a powder but it is more convenient to incorporate the resinous component in water solution of from 50 to 75 percent by weight solids.

One of the difficulties encountered in the molding of gypsum-urea formaldehyde compositions is the tendency for the urea resinous component to squeeze out or for other reasons separate from the cementitious component and migrate to the surface or to flow under molded conditions to the extremities of the mold dies and produce an undesirable and non-uniform molded product. Such migration characteristics have not been observed in compositions based upon gypsum and melamine formaldehyde resin. In order to avoid migration or resinous separation, it was found necessary to employ certain hardeners which function also as catalyzers for the urea formaldehyde resinification reaction and to adjust the pH of the composition to between 4 and 5. For this purpose, best results were secured by the use of organic acids of the type acetic acid, tartaric acid and boric acid. Such acidic hardening agents may be used in amounts ranging from ½ to 1½ parts by weight resinous material. However, it is desirable to use larger concentrations such as up to 10 parts by weight boric acid per 25 parts resinous material.

Other acidic substances may be used to assist resinous cure, such for example as acid salts represented by ferric chloride, sodium hydrogen sulphate, ammonium chloride, diammonium phosphate or the like, or inorganic acids of the type hydrochloric acid. When used, less than 1½ parts by weight per 25 parts of the resinous material are required.

The sodium chloride in Example 1 functions to seed the gypsum reaction and accelerates the setting thereof. Although best results have been secured with sodium chloride in combination with the resinous hardening agents described, other water soluble salts may be used, such as sodium sulphate, potassium chloride, potassium sulphate, sodium carbonate and the like. It is sufficient when such salts are present in amounts ranging from 0.25 to 1 part by weight per 100 parts gypsum but the amount may be increased up to 2 to 3 parts where desired.

Although retarders of the type represented by hydrolyzed keratin absorbed in lime (Red Top retarder marketed by U.S. Gypsum Company) materially increase the pot life of the molding compound, they also tend to weaken the product and markedly decrease the rate of cure of the molding composition thereby undesirably to lengthen the molding cycle. Amounts of retarder up to about 0.25 to 0.5 part by weight per 100 parts gypsum can be used but more is undesirable. It has been found that by the use of a neutral gypsum and a proper balance between hardeners for the urea formaldehyde resin forming material and salts to seed and accelerate the cement cure, a satisfactory pot life of from ½ to 4 hours may be secured in the absence of retarders. Less effect on the strength of the molded product and less effect on the curing rate has been secured in some instances by the use of organic acids and their salts as retarders, such as for example citric acid or sodium and potassium citrate and the like in equivalent amounts to hydrolyze keratin or slightly more.

As previously pointed out, without glass fibers of reinforcing lengths, products molded of compositions of the type described have very little strength, are brittle, and shatter very easily upon impact. While it is desirable to incorporate as much fiber as possible consistent with the ability to secure flow of the desired character, noticeable improvement in the strength properties and in the resiliency of the molded product results when as little as 1 part by weight fiber per 100 parts by weight gypsum is incorporated. Fiber length and fiber concentration have some effect on the flow properties of the molding composition. The flow decreases with increased fiber length or with increased amount of fiber. It has been found that up to about 8 to 10 parts by weight glass fibers in the form of strands, rovings, filaments or the like ranging in lengths from ¼ to 2 inches per 100 parts by weight of cement may be incorporated without difficulty into the slurry and that the fibers so incorporated flow with the compound to remain uniformly distributed throughout the molded product. More fiber can be incorporated into the molding composition but then special techniques such as spatulating or the application of greater forces are required to secure proper distribution and the lessened flow substantially limits use of such compositions for molded products of the type wherein the molding compound can be distributed fairly evenly during loading into the mold space.

It is preferred to use strands or rovings of glass fibers cut to desired lengths because the mass action of the fibers integrated into such bundles seemingly imparts greater strengths to the molded product. Woven, knitted or bonded glass fiber fabrics may be used when cut to small segments of about ½ inch or less but the low flow properties limits usage of such compositions to the manufacture of molded products requiring very little flow during the molding cycle.

To incorporate the glass fibers without balling, it may be necessary to first mix the fibers into the slurry by hand to secure proper wetting out and thereafter rely upon mechanical means to secure uniform distribution. The stiffness of the fiber as controlled by fiber thickness or the size applied thereto is one of the factors to be considered in the distribution of the fibers throughout the slurry without balling as described in the copending application of Lawrence F. Biefeld and Frank O. Brisley, Serial No. 263,998, now Patent No. 2,738,285, filed on December 28, 1951, and entitled "Reinforced Cement Products and Method of Making the Same."

Although somewhat of a different character than the molding composition hereinbefore described, where flow of the molding compound under molding conditions is not necessary, use may be made of woven, knitted or bonded glass fiber fabrics having open mesh incorporated with the cementitious-resinous composition as an incidence to loading the mold. For example, the molding composition free of or containing glass fibers may be introduced into the mold space and one or more glass fiber fabrics draped over the mold and embedded within the composition prior to molding operations. In the event that it is desirable to distribute such fibers in fabric form throughout the mass, less than the full amount of molding composition may be introduced into the mold space and a first fabric embedded therein and then more material added and a second fabric introduced, and so on.

In order to secure easy release of the molded product, it is desirable to apply a lubricant onto the mold surfaces. Polysiloxane fluids or metallic soaps may be used to condition the mold surface in advance of molding or such metallic soaps may be incorporated as an ingredient in the molding composition. Best results are secured when a combination of such lubricants are used, such as by lubricating the mold surface and incorporating a metallic soap into the composition or else dusting the metallic soap onto the composition coincident with its introduction into the mold.

Molding may be carried out under contact pressure or under pressures ranging up to 4000 pounds per square inch, or more, depending upon the amount of force necessary to cause the material to flow in a manner to fill the mold cavity. While rate of cure of the molding composition does not appear to be a function of pressure, the density is increased in response to pressure and the strength properties of the molded product are also increased but not in proportion to density. Molding temperatures within the range of 200° to 275° F. are preferred. The upper temperature range for molding is limited to that which might cause over-cure of the organic resinous component or cause dehydration of the urea formaldehyde resin to reverse the resinification reaction. The preferred temperature range for molding compositions of the type described and claimed herein lies within the range of 250° to 275° F. Under these conditions molded products may be secured in less than 6 minutes, and often as rapidly as from 1 to 3 minutes, depending upon the ingredients employed and the amounts thereof.

The following are further examples of compositions which may be used in the practice of this invention:

EXAMPLE 3

100 parts calcined gypsum (Industrial White Hydrocal)
28 parts urea formaldehyde water soluble resin
15–18 parts water
0.5–1 part sodium chloride
0.5–1 part acidic acid
7.25 parts glass fiber strands in ½ inch lengths A mix containing the above ingredients had a pot life of 1¼ hours and could be molded under pressures of 500 to 4000 pounds per square inch at temperatures of 250° to 275° F. in from 2 to 4 minutes.

EXAMPLE 4

100 parts gypsum cement
5 parts boric acid
42 parts urea formaldehyde resin solution (66% solids)
0.5 part sodium chloride
3 parts water
7.5 parts glass fiber strands cut to ½ inch lengths The pot life of the above composition is about 1 to 2 hours and it can be molded under conditions described in a 2 to 3 minute cycle.

EXAMPLE 5

A composition identical with that of Example 4 except for the addition of 0.25 part Red Top retarder has an increased pot life of 4½ hours but requires better than 4 minutes for molding.

EXAMPLE 6

100 parts calcined gypsum
84 parts urea formaldehyde resin, 66% solids (Urac 180)
0.5 part secondary ammonium phosphate
0.5 part sodium sulphate The above composition has a pot life in excess of 1 hour and cures in about 1 minute at a temperature within the range of 250° to 275° F.

EXAMPLE 7

100 parts calcined gypsum
1 part hydrochloric acid
0.5 part sodium chloride
20 parts urea formaldehyde water soluble resin 16–18 parts water
4.0 parts glass fibers cut to ½ inch lengths This is a continuation of our copending application, Serial No. 284,202, filed April 24, 1952, now Patent No. 2,770,840, and entitled "Plastic Molding Composition."

It will be understood that various changes may be made in ingredients, their ratios and their order of combination to provide a molded product capable of use in the practice of this invention and that various modifications may be made in the details of molding and dehydration thereof without departing from the spirit of the invention, especially as defined in the following claims.

We claim:

1. A pressure molding composition consisting essentially of a curable, water soluble urea formaldehyde resin and calcined gypsum present in the ratio of 1 part by weight of resin to 2–8 parts by weight of gypsum, water in amounts greater than 16 parts by weight per 100 parts by weight but less than 18.6 parts by weight of gypsum, a water soluble acidic substance present in amounts to adjust the pH of the composition to between 4 and 5, a water soluble alkali metal salt to seed the gypsum cure and glass fibers having lengths greater than ¼ inch and present in amounts ranging from 1–10 percent by weight based upon the solids in the molding composition to reinforce the molded product.

2. A molding composition as claimed in claim 1 in which the calcined gypsum is a neutral alpha gypsum in finely divided form.

3. A molding composition as claimed in claim 1 in which the acidic substance comprises an organic acid selected from the group consisting of acetic acid, tartaric acid, and mixtures thereof present in amounts ranging from 0.5 to 10 parts by weight per 100 parts by weight of gypsum.

4. A molding composition as claimed in claim 1 in which the alkali metal salt is present in amounts ranging from 0.25 to 3.0 parts by weight per 100 parts of gypsum.

5. A pressure molding composition consisting essentially of a curable, water soluble urea formaldehyde resin and calcined gypsum present in the ratio of 1 part by weight of the urea resin to 2–8 parts by weight of the gypsum, water present in amounts greater than 16 but less than 18.6 parts by weight per 100 parts by weight of the gypsum, an acidic substance which is water soluble and present in amounts to adjust the pH of the composition to between 4 and 5, a water soluble alkali metal salt present in amounts ranging from 0.25 to 3.0 parts by weight per 100 parts by weight of calcined gypsum, a retarder for the gypsum present in amounts ranging from 0.25 to 0.5 part by weight per 100 parts by weight of calcined gypsum to increase the pot life of the molding composition and glass fibers having lengths greater than ¼ inch and present in amounts ranging from 1–10 percent by weight based upon the solids in the molding composition.

References Cited in the file of this patent

UNITED STATES PATENTS

| | | |
|---|---|---|
| 2,255,998 | Howald et al. | Sept. 16, 1941 |
| 2,664,406 | Armstrong | Dec. 29, 1953 |
| 2,694,025 | Slayter et al. | Nov. 9, 1954 |